(12) United States Patent
Sledzinski et al.

(10) Patent No.: US 10,634,864 B2
(45) Date of Patent: Apr. 28, 2020

(54) CHANNEL EQUALIZATION ENCLOSURE

(71) Applicant: Panduit Corp., Tinley Park, IL (US)

(72) Inventors: Bon B. Sledzinski, Westmont, IL (US); Robert A. Reid, Battleground, IN (US); Joseph E. Sanders, Elwood, IL (US)

(73) Assignee: Panduit Corp., Tinley Park, IL (US)

( * ) Notice: Subject to any disclaimer, the term of this patent is extended or adjusted under 35 U.S.C. 154(b) by 29 days.

(21) Appl. No.: 15/989,968

(22) Filed: May 25, 2018

(65) Prior Publication Data

US 2018/0348461 A1 Dec. 6, 2018

Related U.S. Application Data

(60) Provisional application No. 62/512,369, filed on May 30, 2017.

(51) Int. Cl.
*G02B 6/44* (2006.01)

(52) U.S. Cl.
CPC ......... *G02B 6/4446* (2013.01); *G02B 6/4452* (2013.01); *G02B 6/4454* (2013.01); *G02B 6/4457* (2013.01); *G02B 6/4471* (2013.01)

(58) Field of Classification Search
CPC .. G02B 6/4446; G02B 6/4452; G02B 6/4457; G02B 6/4454; G02B 6/4471
See application file for complete search history.

(56) References Cited

U.S. PATENT DOCUMENTS

| | | |
|---|---|---|
| 5,100,221 A | 3/1992 | Carney et al. |
| 6,643,443 B2 | 11/2003 | Holman et al. |
| 7,346,253 B2 | 3/2008 | Bloodworth et al. |
| 7,418,184 B1 | 8/2008 | Gonzales et al. |
| 7,702,208 B2 | 4/2010 | Mudd et al. |
| 7,756,379 B2 | 7/2010 | Kowalczyk et al. |
| 7,894,701 B2 | 2/2011 | Kowalczyk et al. |
| 7,936,962 B2 | 5/2011 | Mudd et al. |
| 7,945,138 B2 | 5/2011 | Hill et al. |
| 8,189,984 B2 | 5/2012 | Kowalczyk et al. |
| 8,494,333 B2 | 7/2013 | Kowalczyk et al. |
| 8,705,929 B2 | 4/2014 | Kowalczyk et al. |
| 8,805,152 B2 | 8/2014 | Smith et al. |

(Continued)

FOREIGN PATENT DOCUMENTS

| | | |
|---|---|---|
| WO | 2008027201 A2 | 3/2008 |
| WO | 2011116081 A1 | 9/2011 |

OTHER PUBLICATIONS

Panduit, Opticom QuickNet Rack Mount Fiber Cassette Enclosures, 2015 (Year: 2015).*

(Continued)

*Primary Examiner* — Peter Radkowski
(74) *Attorney, Agent, or Firm* — Christopher S. Clancy; James H. Williams; Aimee E. McVady

(57) ABSTRACT

A channel equalization enclosure equalizes the length of cable variance with customers' equipment in a data center. The channel equalization modules serve as a connection point between cable from a financial institution and patch cords connected to customer equipment. The channel equalization enclosure includes a housing and a plurality of channel equalization modules mounted in the housing. Each channel equalization module has a spool of bulk fiber for accommodating a specified fiber length to equalize a communication channel in the data center.

8 Claims, 5 Drawing Sheets

(56) References Cited

U.S. PATENT DOCUMENTS

| | | |
|---|---|---|
| 8,891,931 B2 | 11/2014 | Kowalczyk et al. |
| 8,929,708 B2 | 1/2015 | Pimentel et al. |
| 9,188,760 B2 | 11/2015 | Kowalczyk et al. |
| 9,261,663 B2 | 2/2016 | Loeffelholz et al. |
| 9,261,666 B2 | 2/2016 | Kowalczyk et al. |
| 9,279,951 B2 | 3/2016 | McGranahan et al. |
| 9,329,352 B2 | 5/2016 | de los Santos Campos et al. |
| 9,429,729 B2 | 8/2016 | Burek et al. |
| 9,523,834 B2 | 12/2016 | Kowalczyk et al. |
| 9,563,031 B2 | 2/2017 | Loeffelholz et al. |
| 9,606,319 B2 | 3/2017 | Kowalczyk et al. |
| 2008/0027201 A1 | 1/2008 | Yilgor et al. |
| 2010/0329621 A1 | 12/2010 | Makrides-Saravanos et al. |
| 2011/0116081 A1 | 5/2011 | Sugimoto |
| 2017/0146763 A1 | 5/2017 | Galvan Mijangos et al. |

OTHER PUBLICATIONS

He et al., A survey on recent advances in optical communications, Computers and Electrical Engineering 40 (2014) 216-240 (Year: 2901).*

Ciena, Low-Latency, High-Performance Optical Networking Solutions, 2011 (Year: 2011).*

* cited by examiner

CHANNEL EQUALIZATION ENCLOSURE

CROSS REFERENCE TO RELATED APPLICATIONS

This application claims priority to U.S. Provisional Application Ser. No. 62/512,369, filed May 30, 2017, the subject matter of which is hereby incorporated by reference in its entirety.

FIELD OF THE INVENTION

The present invention relates to a fiber optic enclosure, and more particularly to channel equalization modules installed in a fiber optic enclosure.

BACKGROUND OF THE INVENTION

The length of fiber optic cabling can vary between a customers' equipment and the financial institution or stock exchange the equipment is connected to. Financial institutions and stock exchanges are attempting to equalize the cable distance of all the fiber channels within their data center. The financial institutions and stock exchanges need to assure their customers that all data transactions will require the same amount of time to complete. If the financial institutions and stock exchanges fail to equalize the cable variation, some customers would have an advantage over others.

Thus, it is desirable to equalize the length of cable variance with each customers' equipment and the financial institution or the stock exchange.

SUMMARY OF THE INVENTION

A channel equalization enclosure designed to equalize the length of cable variance with customers' equipment in a data center. The channel equalization enclosure includes a housing and a plurality of channel equalization modules mounted in the housing. Each channel equalization module has a spool of bulk fiber to accommodating a specified fiber length to equalize the communication channels between customers' equipment and a financial institution in the data center.

DETAILED DESCRIPTION

Figure 1:
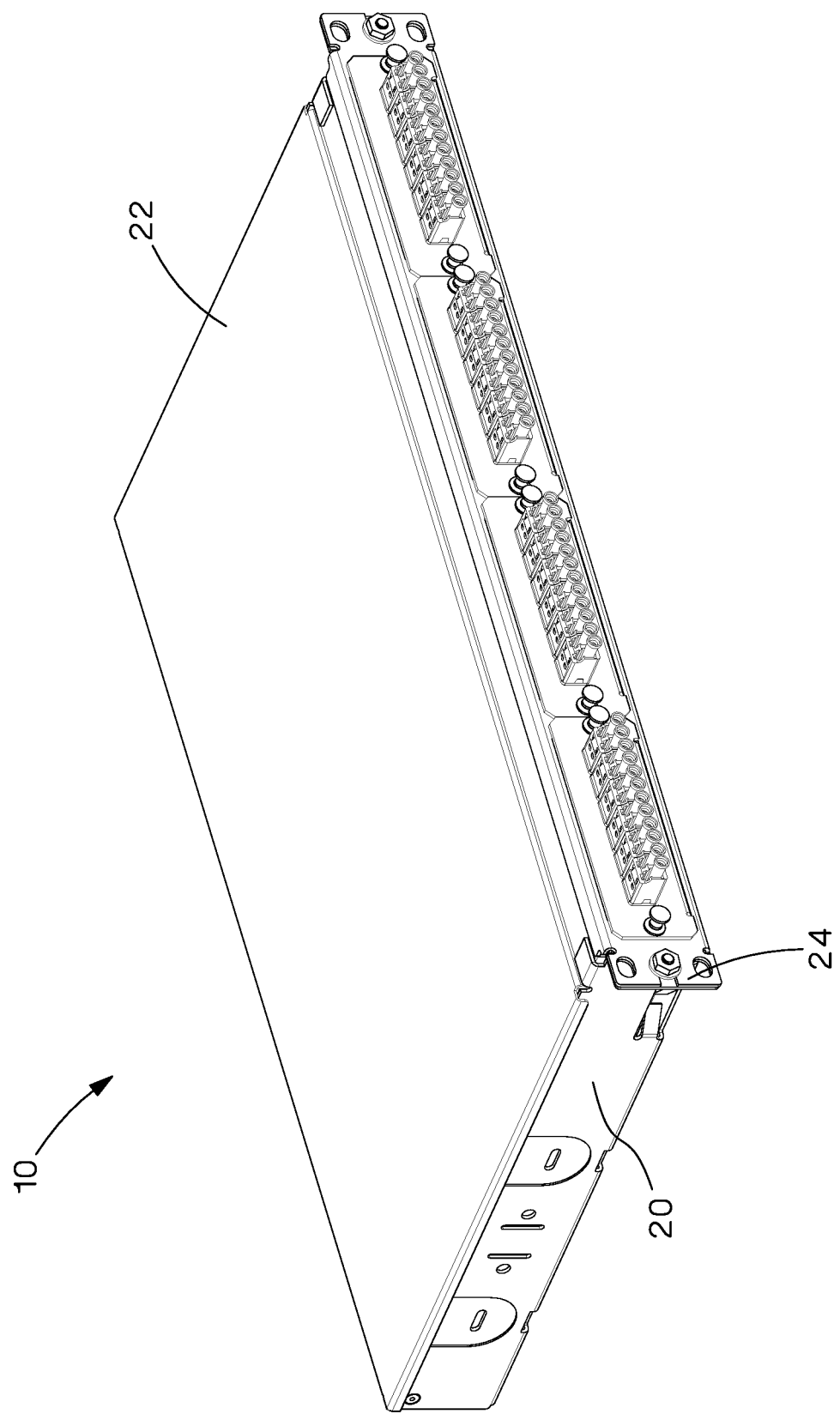
FIG. 1 is a perspective view of a channel equalization enclosure of the present invention.

FIG. 1 illustrates a perspective view of a channel equalization enclosure 10 of the present invention.

Figure 2:
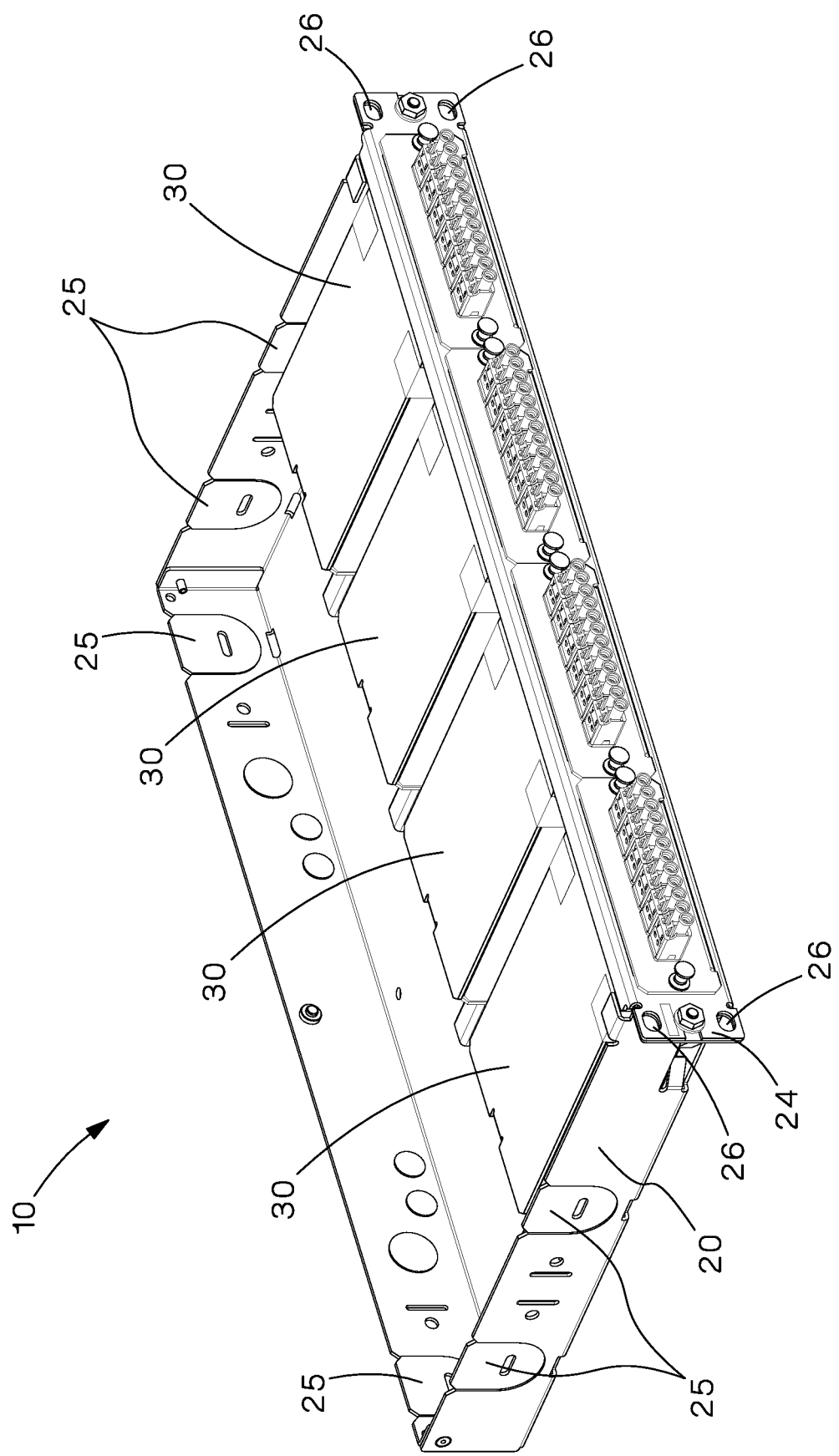
FIG. 2 is a perspective view of the channel equalization enclosure of FIG. 1 with the top removed to illustrate the channel equalization modules.

FIG. 2 illustrates a perspective view of the channel equalization enclosure 10 with the top removed. The channel equalization enclosure 10 is a sheet metal housing 20 designed to house four channel equalization modules 30. The housing 20 includes a removable top 22 (see FIG. 1) and a front flange 24.

Figure 3:
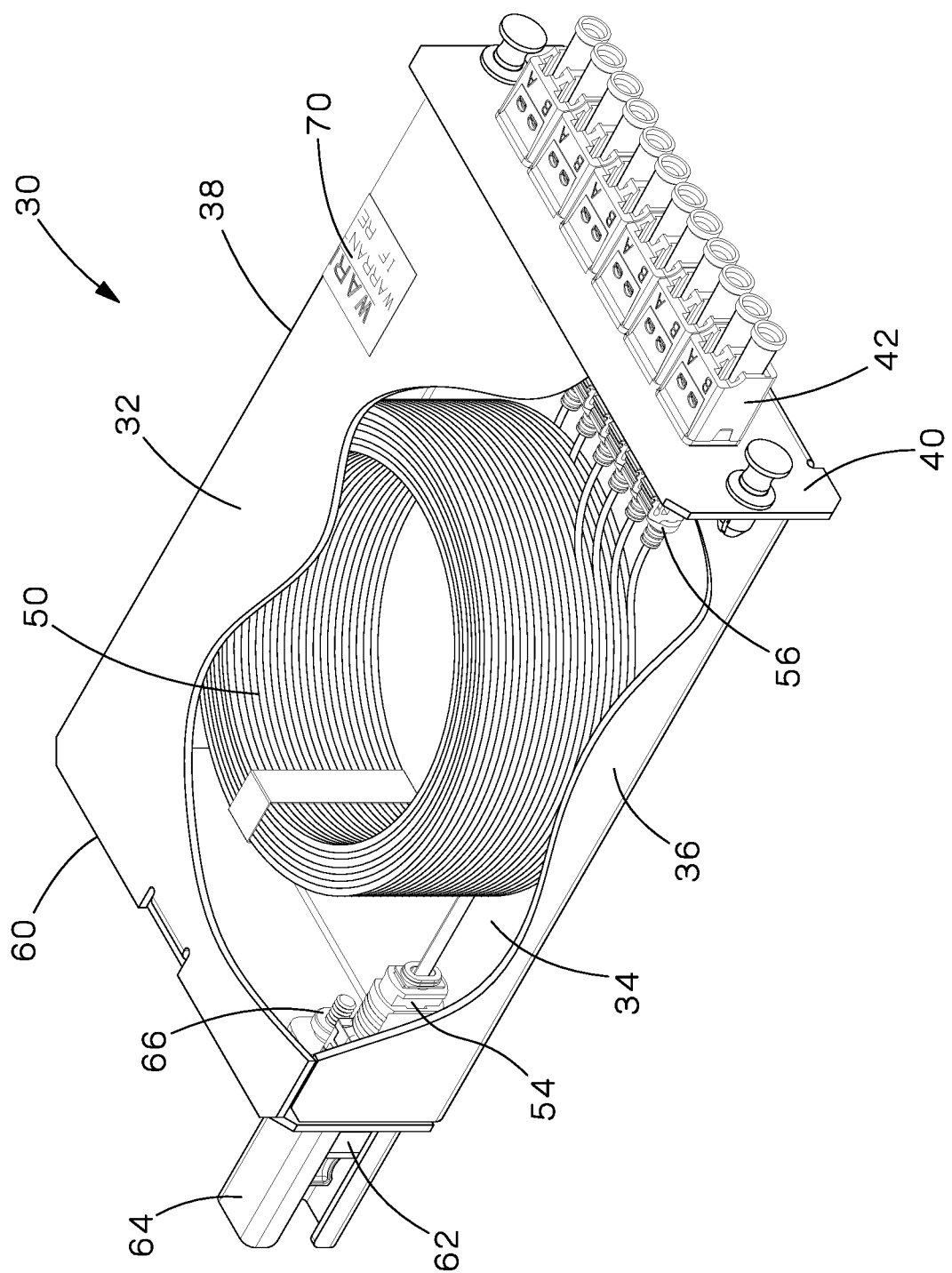
FIG. 3 is a front perspective view of one of the channel equalization modules of FIG. 2.

FIG. 3 illustrates one of the channel equalization modules 30. The channel equalization module 30 includes a top 32, a bottom 34, sides 36, 38, a front 40, and a back 60. In FIG. 3, part of the top 32 and part of a side 36 of the channel equalization module 30 are removed so the inside of the module 30 is visible. The channel equalization module 30 includes a spool of slack bulk fiber 50 to accommodate a specific fiber length needed to equalize the communication channel.

For example, if the longest fiber channel in a financial institutions' data center is 230 meters and another fiber channel is 200 meters, the channel equalization module will have an additional 30 meters of slack bulk fiber 50 to make up the difference of the shorter fiber channel.

Once the equalization fiber length is determined, the specific channel equalization module is selected and installed. Each channel equalization module 30 is designed to accommodate specific lengths of fiber cabling. The channel equalization module 30 includes tamper resistance labels 70 to ensure the channel equalization modules 30 are not opened and altered.

The slack bulk fiber 50 will be terminated with a multifiber connector 54 on one end. The multifiber connector 54 would be installed into an adapter 62 in the back 60 of the module 30. The incoming cable from the financial institution is plugged into adapter 62. The opposite end of the slack bulk fiber 50 will be terminated with a plurality of single fiber connectors 56 installed in adapters 42 in the front 40 of the module 30.

Figure 4:
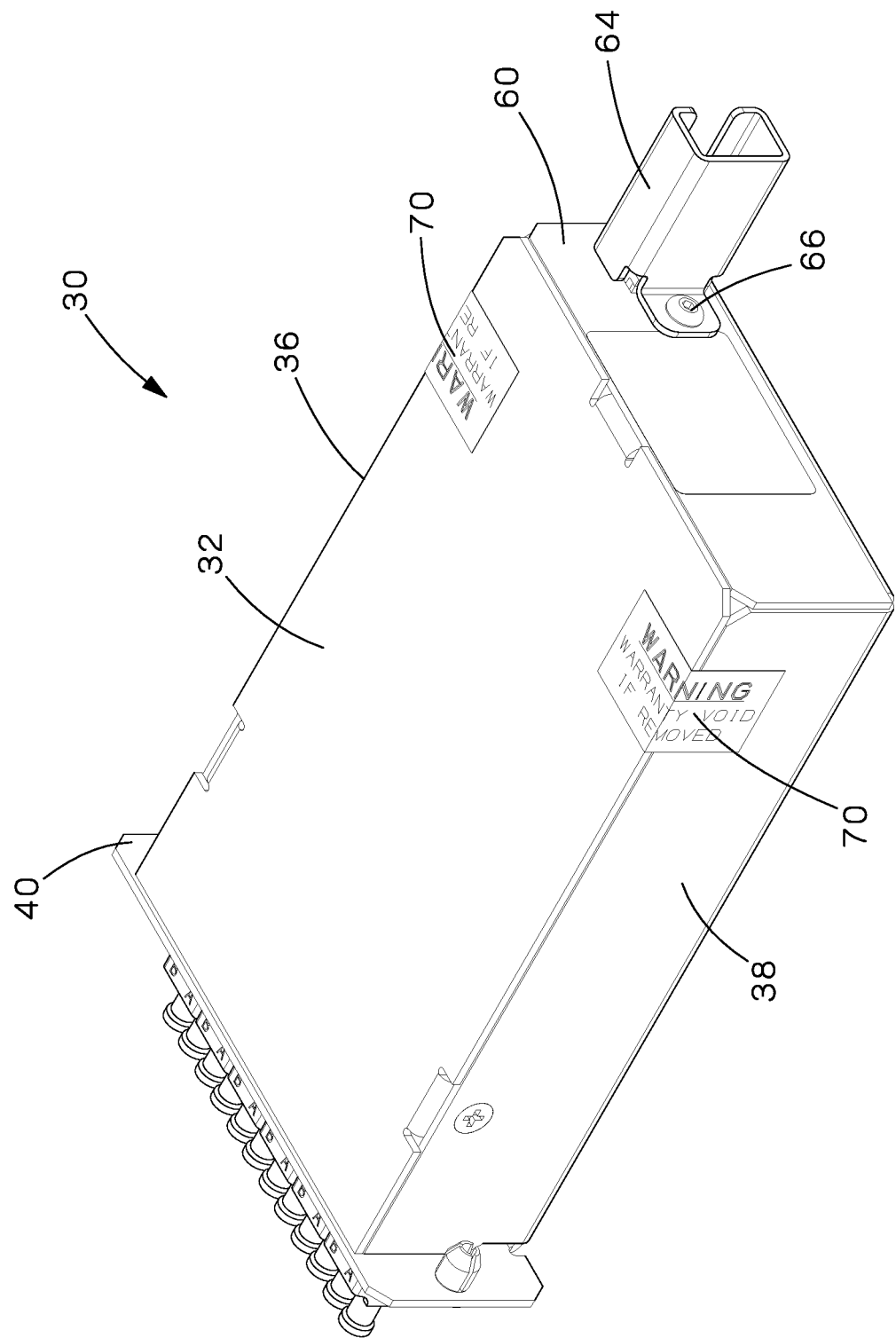
FIG. 4 is a rear perspective view of the channel equalization module of FIG. 3.

As illustrated in FIG. 4, a guard 64 is installed over the multifiber connector adapter 62 in the back 60 of the channel equalization module 30. The guard 64 is secured to the module 30 with a tamper resistant screw 66. The guard 64 covers the release of the multifiber connector adapter 62, making removal of the multi fiber connector adapter 62 very difficult. Thus, the guard 64 prevents users from switching channel equalization modules 30 to alter the equalized channels in the data center.

Figure 5:
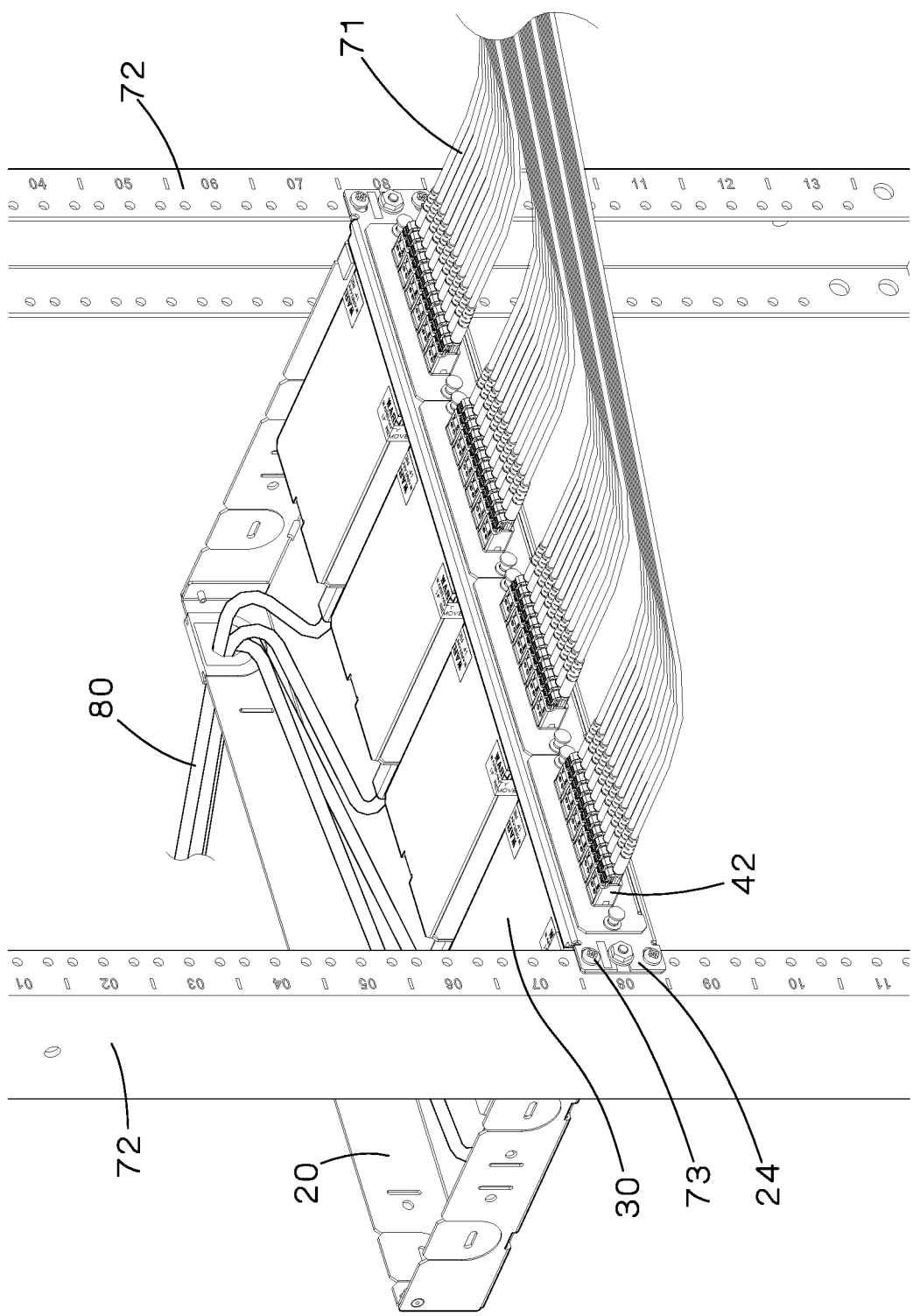
FIG. 5 is a front perspective view of the channel equalization enclosure of FIG. 1, installed on equipment rails and fiber optic cables plugged in, with the top removed to illustrate the channel equalization modules.

Referring to FIG. 5, the front flange 24 has mounting holes 26 (see FIG. 2), which allow the channel equalization enclosure to be mounted to standard 19" equipment rails 72 of a data center cabinet or rack using screws 73. The housing 20 includes knock out holes 25 (see FIG. 2), one or more of which are to be removed to serve as entrance for incoming cable 80 from the financial institution, into the housing 20. The incoming cable 80 from the financial institution is plugged into an adapter 62 (see FIG. 3) in the back of the module 30. The patch cords 71, connected to customers' equipment, are plugged into the single fiber adapters 42 of modules 30.

The channel equalization module 30 will serve as a connection point between the cable from the financial institution or the stock exchange and the patch cords connected to customers' equipment.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

The invention claimed is:

1. A channel equalization enclosure for equalizing a length of cable variance with customers' equipment, the channel equalization enclosure comprising:
   a housing; and
   a plurality of channel equalization modules mounted in the housing, each channel equalization module having a spool of bulk fiber secured in the channel equalization module, the spool of bulk fiber includes a specified fiber length that equalizes a communication channel.

2. The channel equalization enclosure of claim 1, wherein the housing has a removable top.

3. The channel equalization enclosure of claim 1, wherein the housing having a front flange for enabling the housing to be mounted to equipment rails.

4. The channel equalization enclosure of claim 1, wherein the channel equalization modules having a tamper resistant label to ensure the channel equalization modules are not altered.

5. The channel equalization enclosure of claim 1, wherein the spool of bulk fiber is terminated with a multifiber connector on one end and a plurality of single fiber connectors at an opposite end.

6. The channel equalization enclosure of claim 5, wherein the multifiber connector is installed in an adapter at a back of each channel equalization module and the plurality of single fiber connectors are installed in adapters at a front of each channel equalization module.

7. The channel equalization enclosure of claim 6, wherein a guard is installed over the adapter and multifiber connector at the back of each channel equalization module to prevent users from altering each channel equalization module.

8. The channel equalization enclosure of claim 1, wherein the channel equalization modules serve as a connection point between cable from a financial institution and patch cords connected to customer equipment.

* * * * *